March 24, 1936.   C. E. HUDDLESTON   2,035,071
CARD WRITING MACHINE
Filed May 28, 1934    7 Sheets-Sheet 1
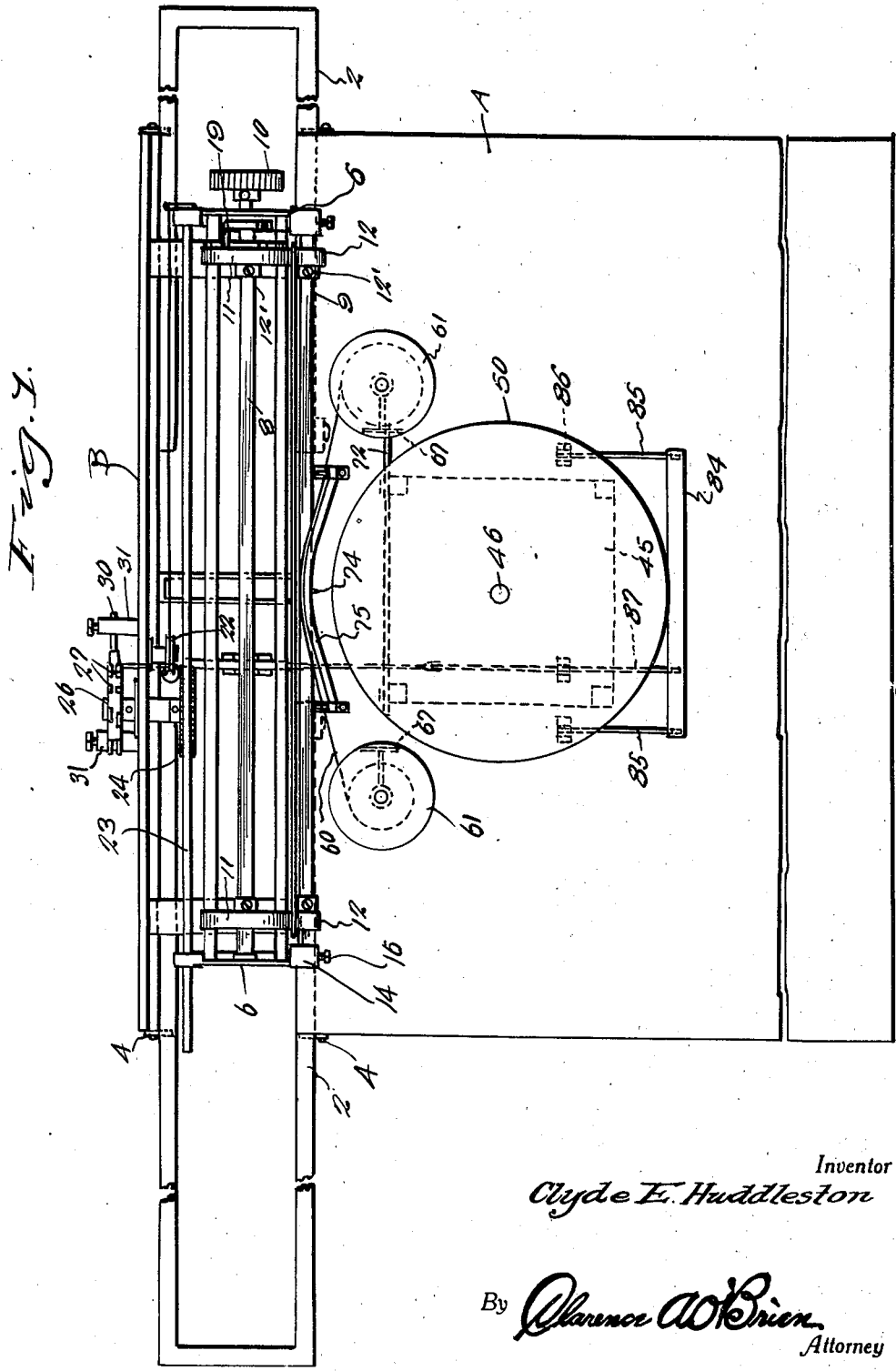
Inventor
Clyde E. Huddleston
By Clarence A. O'Brien
Attorney March 24, 1936.  C. E. HUDDLESTON  2,035,071
CARD WRITING MACHINE
Filed May 28, 1934   7 Sheets-Sheet 2
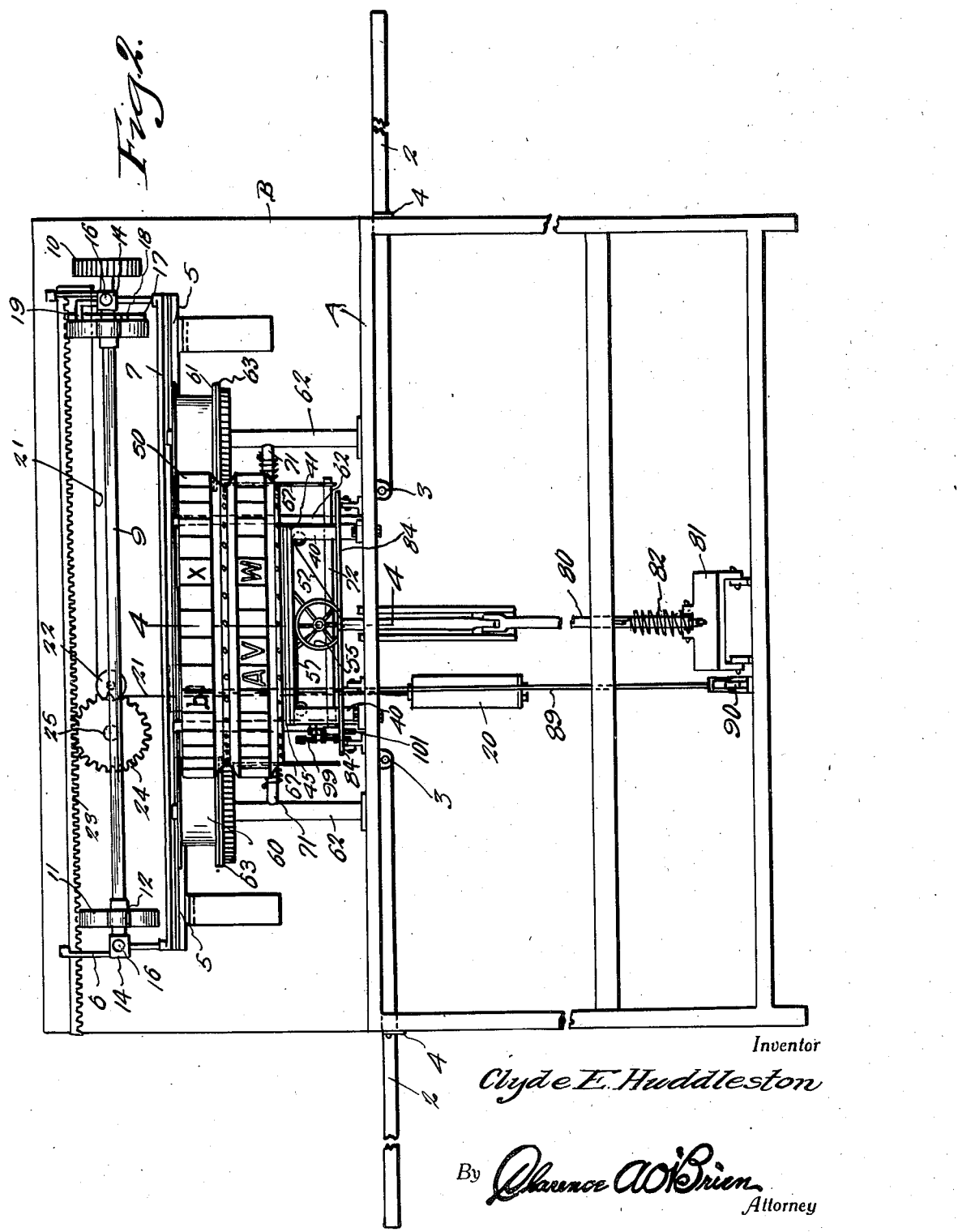
Inventor
Clyde E. Huddleston
By Clarence A. O'Brien
Attorney March 24, 1936.  C. E. HUDDLESTON  2,035,071
CARD WRITING MACHINE
Filed May 28, 1934    7 Sheets-Sheet 3
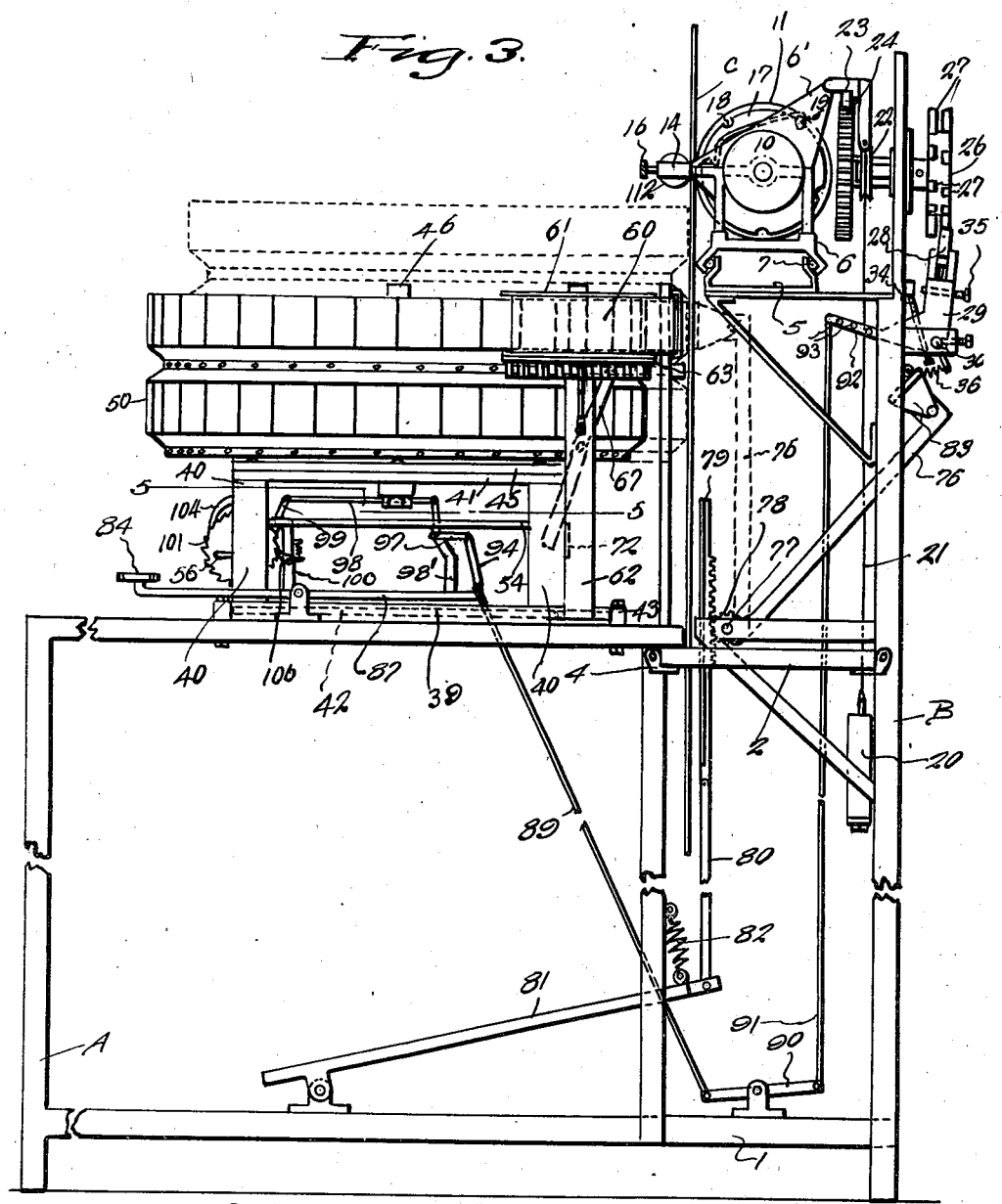
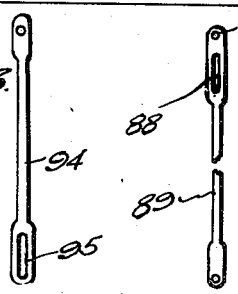
Inventor
Clyde E. Huddleston
By Clarence A. O'Brien
Attorney

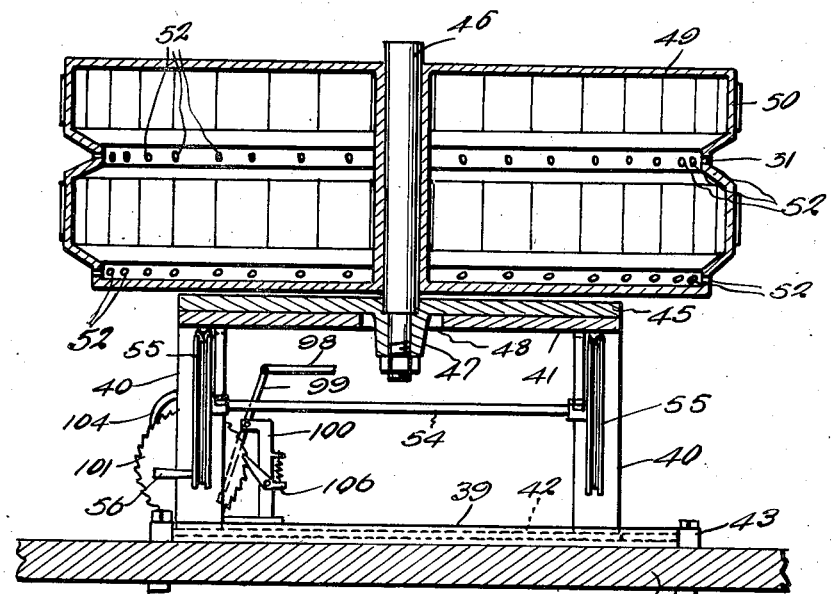
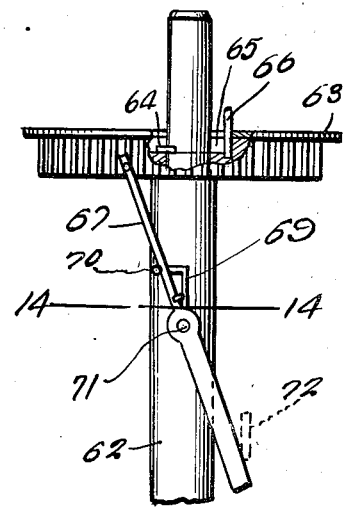
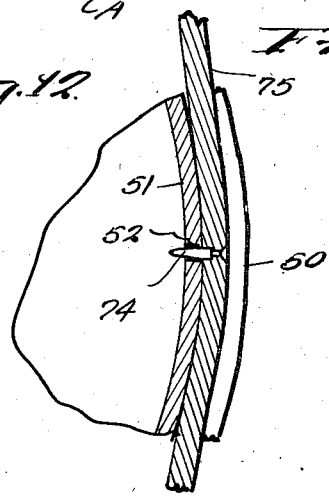
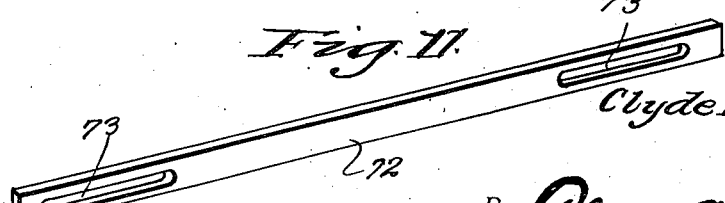

March 24, 1936.  C. E. HUDDLESTON  2,035,071
CARD WRITING MACHINE
Filed May 28, 1934  7 Sheets-Sheet 5
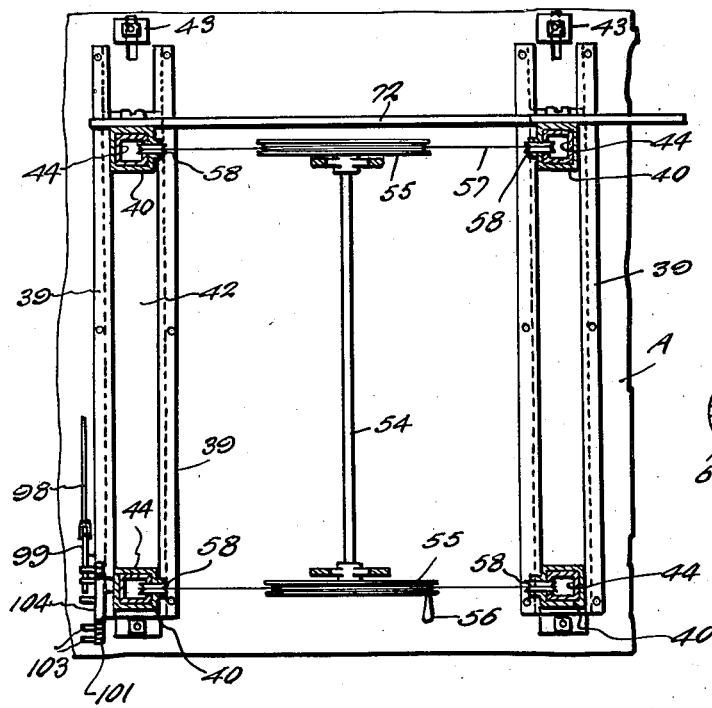
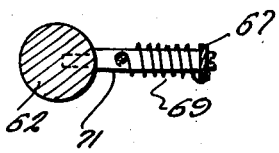
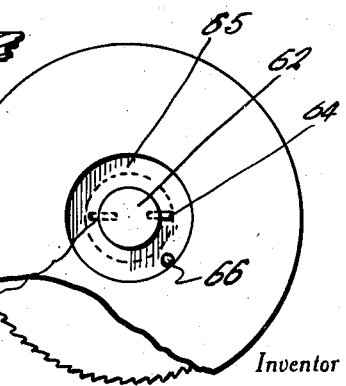
Inventor
Clyd. E. Huddleston
By Clarence A. O'Brien
Attorney March 24, 1936.  C. E. HUDDLESTON  2,035,071
CARD WRITING MACHINE
Filed May 28, 1934  7 Sheets-Sheet 6
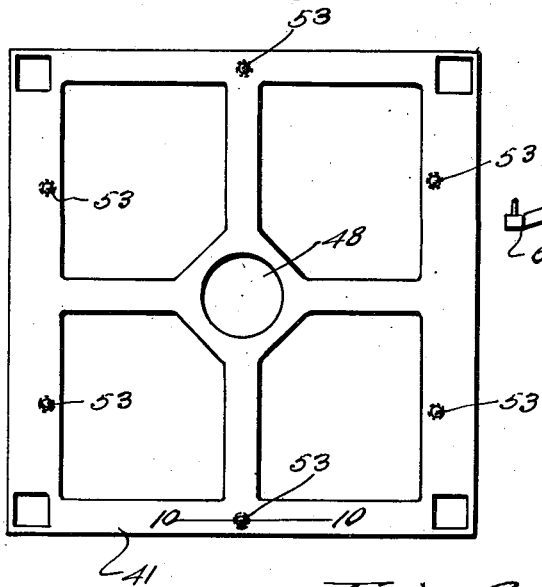
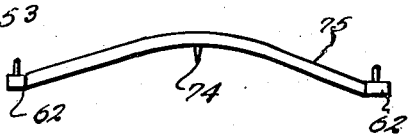
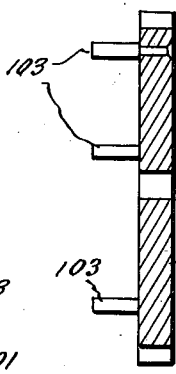
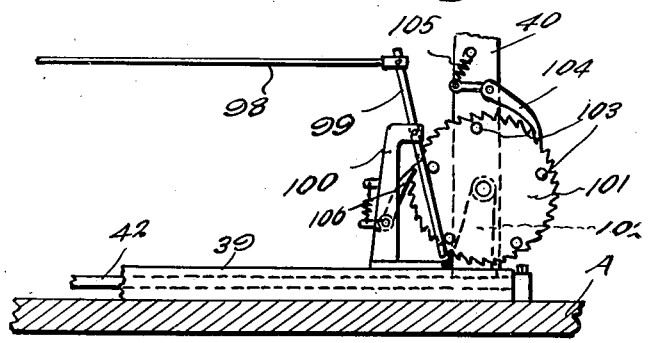
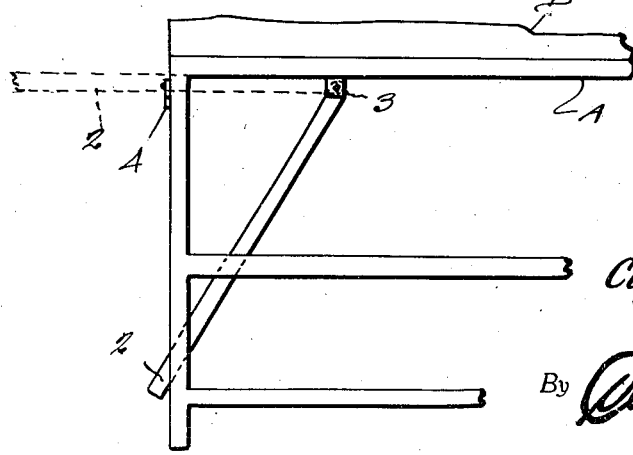
Inventor
Clyde E. Huddleston
By Clarence A. O'Brien
Attorney March 24, 1936.  C. E. HUDDLESTON  2,035,071
CARD WRITING MACHINE
Filed May 28, 1934   7 Sheets-Sheet 7
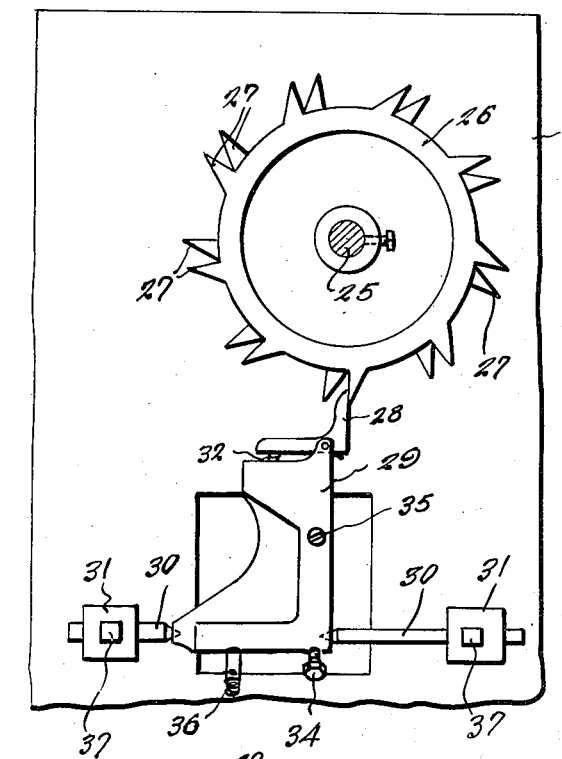
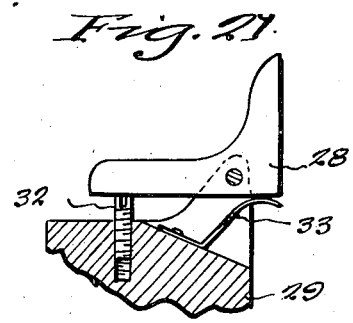
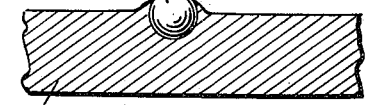
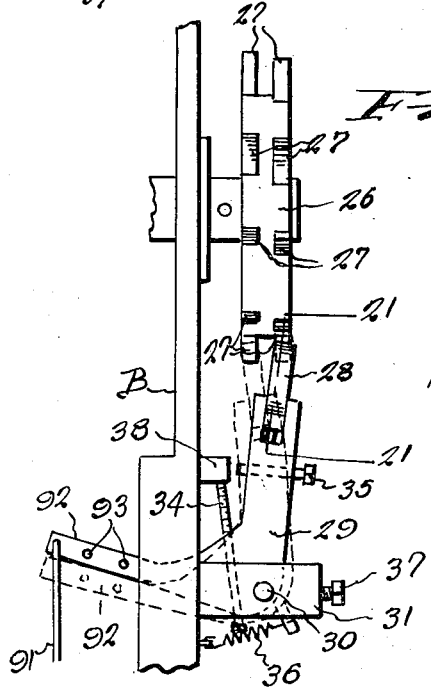
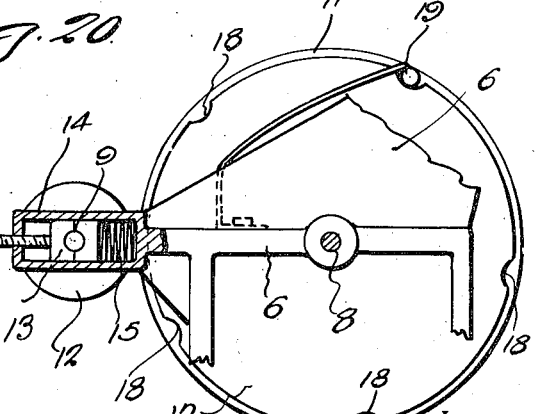
Inventor
Clyde E. Huddleston
By Clarence A. O'Brien
Attorney Patented Mar. 24, 1936

2,035,071

UNITED STATES PATENT OFFICE 2,035,071

CARD WRITING MACHINE

Clyde E. Huddleston, Wilmington, Calif.

Application May 28, 1934, Serial No. 728,025

6 Claims. (Cl. 197—44)

This invention relates to a card writing machine, the general object of the invention being to provide a simple form of machine which can be cheaply manufactured and easily operated by hand, whereby one can print cards of various kinds for advertising and other purposes.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a top plan view of the invention.

Figure 2 is a front view thereof.

Figure 3 is an end view thereof.

Figure 4 is a section on line 4—4 of Figure 2.

Figure 5 is a section on line 5—5 of Figure 3.

Figure 6 is a fragmentary vertical sectional view through the stands which support the type drum.

Figure 7 is a top plan view of the upper stand.

Figure 8 is a side view, showing the ratchet means for operating the escapement by sliding movement of the stands.

Figure 9 is a sectional view through the ratchet wheel.

Figure 10 is a section on line 10—10 of Figure 7.

Figure 11 is a view of the bar for operating the ribbon feeding means.

Figure 12 is a side view of the ribbon feeding means parts of the ratchet disk being broken away to show the countersink therein.

Figure 13 is a view of the ratchet wheel which forms part of the ribbon feeding means.

Figure 14 is a section on line 14—14 of Figure 12.

Figure 15 is a view of the lever which operates the ratchet wheel of the ribbon means.

Figure 16 is a top plan view of the pin carrying bar which holds the type drum stationary when the drum is in printing position.

Figure 17 is a sectional view showing how the pin engages the drum.

Figure 18 is a detail view showing one of the U-shaped braces for connecting the two parts of the frame together in lowered position.

Figure 19 is a view of the escapement mechanism.

Figure 20 is a side view thereof.

Figure 21 is a sectional view on the line 21—21 of Figure 20.

Figure 22 is a view, partly in section, of the paper or card feeding means.

Figure 23 is a view of the link which forms part of the means for operating the escapement mechanism, by sliding movement of the type drum supporting means.

Figure 24 is a view of the long link which forms part of such means.

Figure 25 is a view of the plate connecting two legs of a stand together.

In these drawings, the letter A indicates the front frame and the letter B indicates the rear frame, the frame B extending well above the top of the front frame A and the frames are slightly spaced apart to provide a space for the card or sheet C which is to be printed upon. The two frames are connected together adjacent their lower ends by the cross pieces 1 and they are also connected together by the U-shaped members 2, one of which is located at each side of the device, and the inner end of each member 2 is pivoted to the frames A and B, as shown at 3 in Figure 18, so that the member can be swung downwardly, as shown in full lines in Figure 18, when the device is not in use. As will be seen from Figure 1, when the two members 2 are swung upwardly, they will connect the two frames together and at the same time provide a space in which the card or sheet C can move as the carriage is moved back and forth during the operation of the device. Any suitable form of latch means 4 can be used for holding the members in raised position, as shown in Figure 3.

A track forming member 5 is carried by the upper portion of the rear frame B and the carriage 6 is slidably supported by this track member through means of the anti-friction bearings 7. This carriage carries the rear card feeding shaft 8 and the front feeding shaft 9, the shaft 8 being manually turned by the usual knob 10 and said shaft 8 carries the disks or rolls 11 for engaging the card or sheet C, while the shaft 9 carries the small disks or rolls 12. The ends of the shaft 9 are journaled in the bearing blocks 13 (see Fig. 22) slidably arranged in the housings 14 carried by the carriage for movement toward and away from the shaft 8, and a spring 15 is located in each housing and tends to press the shaft 9 away from the shaft 8 and a set screw 16 is threaded in the front end of each housing for adjusting the tension of the spring 15 and also adjusting the distance between the rolls 12 and the rolls 11. Thus the two sets of rolls can be adjusted for different thicknesses of cards. A disk 17 is attached to the shaft 8 and is provided with spaced notches 18 and its periphery for receiving the spring detent 19 carried by the carriage so that by turning the shaft 8 by its knob 10, the shaft 8 and its rolls 11 can be adjusted to the desired degree and the spring detent 19 will hold the parts in adjusted position. By providing a plurality of these notches, the spaces between the lines of printing can be varied as desired.

The carriage is moved to the left by means of a weight 20 attached to the end of a cable 21 which passes over a pulley 22 carried by a part of the rear frame B and said cable is attached to the carriage in any suitable manner. A rack bar 23 is also carried by the carriage and a toothed wheel 24 engages the rack bar and is attached to a shaft 25 journaled in the rear upper part of the frame B and this shaft has attached to its rear end the escapement wheel 26 which is provided with the spaced pairs of teeth 27, the teeth of each pair being spaced laterally and one in advance of the other, as shown more particularly in Figures 19 and 20. As will be seen, the toothed wheel 24 and the rack bar 23, which is carried by the brackets 6' of the carriage 6, prevent movement of the carriage by the weight until the escapement wheel 26 is free to move. This escapement wheel is normally held against movement in one direction by a pivoted dog 28 carried by a member 29, said member being supported for forward and rearward rocking movement by the pins 30 adjustably connected to the brackets 31 carried by the rear part of the rear frame B. An adjustable stop 32 (see Figure 21) limits movement of the dog 28 in one direction and a spring 33 yieldingly holds the dog against movement in the opposite direction. As will be seen, the dog 28 acts to prevent movement of the carriage to the left, but permits the carriage to be moved by hand to the right. Adjustable stop pins 34 and 35 are carried by the member 29 for limiting movement in both directions, and as will be seen from Figures 19 and 20, when the member 29 is moved in one direction, the dog will move out of engagement with one tooth of a pair of teeth 27, so that the escapement wheel will rotate as the shaft 25 is rotated through means of the rack bar on the carriage and the movement of the carriage under the action of the weight, until the first tooth of the next pair engages the dog and the wheel will come to rest and then as the member 29 is released, it moves back to its original position under the action of the spring 36 and then the dog 28 will engage the last tooth of said pair of teeth 27. The pins 30 are held in adjusted position in the brackets 31 by the set screws 37 and the stop pins engage a projection 38 on the rear frame B, as more clearly shown in Figure 20.

A pair of guideways 39 is mounted on the top of the front frame A and the lower ends of the legs 40 of the lower stand 41 slide in these guideways. Each pair of front and rear legs 40 are connected together by a bar or plate 42, as shown more particularly in Figure 25, and an adjustable stop 43 limits the rearward movement of each bar or plate 42. The legs 40 are of hollow construction and the hollow legs 44 of the upper stand 45 telescope into the legs 40 and a post 46 has its lower end fastened in a depending projection 47 (see Figure 4) in the top of the stand 45, the top of the stand 41 having an opening 48 therein through which the projection 47 passes, as shown more particularly in Figure 4. This post rotatably supports the type carrying drum 49 which has upper and lower type carrying portions 50 which are separated by an annular groove 51 in the drum and the inner part of this groove has its walls provided with perforations 52 and similar perforations, also indicated at 52, are carried by the lower part of the drum. The drum rests upon the anti-friction bearings 53 carried by the top part of the upper stand 45, (see Figure 10).

A shaft 54 is rotatably supported by the lower stand 41 and has the pulleys 55 attached thereto, the forward one of which is provided with a handle 56 so that the shaft and the two pulleys can be rotated and cables 57 are attached to these pulleys and pass over the pulleys 58 carried by the lower stand and have their ends connected with the legs 44 of the upper stand 45, as shown at 59 in Figure 6, the cables being so arranged that as the shaft 54 is turned in one direction, the upper stand will be moved upwardly and as the shaft 54 is turned in the opposite direction, the weight of the stand 45 and of the drum will cause the upper stand and the drum to move downwardly. Thus the drum can be raised or lowered to cause the upper or lower type to be moved into the printing plane. It will also be seen that the two stands, with the drum, can be moved forwardly and rearwardly, the parts being in printing position when in rearward position.

An ink ribbon 60 is carried by the spools 61 which are rotatably mounted on the posts 62 (see Figures 12 and 13) carried by the rear part of the front frame A and each post rotatably supports a ratchet disk 63, each disk being rotatably held on its post by pins 64 carried by the post and extending into a countersink 65 formed in the disk. Each disk carries an upwardly extending pin 66 for engaging a hole in a spool 61 for causing the spool to rotate with the disk. As will be seen from Figure 12, the upper part of the post is reduced to form a shoulder on which the disk 63 rests and a lever 67 (see Figures 12 and 15) is pivoted to the post and the upper part of the lever is reduced to make this part slightly resilient. The upper end of the lever carries a pin 68 for engaging the teeth of the ratchet disk and a spring 69 normally holds the lever against a stop 70 on the post, the lever being pivoted to a stud 71 carried by the post and the spring is wound on this stud, (see Figure 14). A bar 72 is slidably connected to the rear posts of the lower table through means of pins passing through elongated slots 73 (see Figure 11) in the bar so that either end of the bar can be projected, as shown in Figure 5, so that this end will engage one of the levers 67 to rock the same and thus cause a feeding action of the ribbon. It will, of course, be understood that one spool will be rotated step by step by that lever which is rocked by the projected end of the bar 72 and when the other spool is to be rotated to rewind the ribbon thereupon, the opposite end of the bar is projected to operate the other lever. Of course, the rocking movement of the lever will rotate the ratchet disk 63 and the lever is returned to its normal position by the spring 69, but when moved by the spring, the pin 68 simply ratchets over the teeth of the disk due to the flexibility of the upper part of the lever, the teeth being arranged as shown in Figure 13 to permit this.

As the drum is moved rearwardly into printing position, a pin 74 on a bar 75 carried by the rear part of the front frame B, will engage one of the perforations 52 to hold the drum steady during the printing operation.

A portion of the card is pressed against the printing ribbon and against a type on the drum by means of a hammer member 76 having its lower end pivoted to a part of the rear frame, as shown at 77, and this end is formed with a segmental gear 78 engaged by a rack bar 79 supported for sliding movement in the rear frame B and having its rear end connected by a link 80 with a foot pedal 81 which is normally held in raised position by a spring 82. Thus by pressing upon the pedal, the rack bar will swing the hammer member 76 forwardly into the dotted line position shown in Figure 3, so that the head 83 of the member strikes the card C and thus forces a portion of it against the ribbon and against a type of the drum, which is in typing position.

A space bar is shown at 84 and is supported by the arms 85 which are pivoted to the top part of the frame A, as shown at 86, and an arm 87 is connected with the bar and has its rear end provided with a projection which operates in a slot 88 in the upper end of a long link 89 (see Figures 3 and 24), the lower end of which is connected to a lever 90 pivoted to the lower part of the frame B and a link 91 is pivoted to the rear end of the lever 90 and is adjustably connected to an arm 92 of the escapement member 29, said arm 92 having a plurality of holes 93 therein for permitting the link 91 to be adjustably connected to the arm. Thus it will be seen that when the space bar 84 is operated, the escapement mechanism will be actuated to move the carriage one step to the left.

I also provide means whereby horizontal movement of the type drum will operate the escapement mechanism to properly space the characters being printed, and such means includes a link 94, (see Figure 23) having a slot 95 in its lower end which receives a pin 96 in the upper end of the rod 89 and the upper end of the link 94 is pivoted to a bell crank lever 97 (see Figure 3) which is pivoted to a post 98' carried by the upper part of the frame A and as will be seen, by providing the slots 88 and 95 in the rods 89 and 94, as shown in Figures 3, 23 and 24, the escapement mechanism may be operated either by the space bar 84 or by the movement of the type drum without interference. The bell crank lever 97 is connected by a link 98 to a lever 99, (see Figure 8), which is pivoted intermediate its ends to an upright 100 carried by the frame A. A ratchet wheel 101, pivoted to a bracket 102 carried by the frame A, is provided with a plurality of pins 103, (see Figures 8 and 9) and these pins engage the lever 99 to rock the same. The ratchet wheel 101 is engaged by a dog 104 pivoted to one of the legs 40 of the lower stand and is held engaged with the teeth of the ratchet wheel by a spring 105. A holding dog 106, carried by the bracket 100, prevents retrograde movement of the ratchet wheel. Thus as the stands, with the type drum, are moved rearwardly into printing position, the dog 104 ratchets over the wheel 101 and on the return movement of the parts, the dog 104 turns the wheel 101 and thus the pins 103 rock the lever 99 and through the connections shown, operates the escapement mechanism to provide a space between the character just printed and the next character to be printed.

The drum can be readily removed from the post and another drum substituted therefor, so that by providing a plurality of these drums having different type characters thereon, different kinds of characters can be printed upon the cards and as will be seen, cards of considerable length and width and of varying thicknesses, can be printed by the device. The parts are of simple operation and the device can be manufactured at low cost.

The rolls 11 and 12 are adjustably supported on their shafts, as shown at 12' in Figure 1, and the shafts are preferably of rectangular or square shape in cross section and the openings in the rolls through which the shafts pass are of the same shape. By adjusting the rolls on their shafts, different widths of cards can be printed upon by the device.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. In a printing machine of the class described, a main frame having an upright extension at its rear part, a carriage slidably arranged on said upright portion, a weighted cable attached to the carriage for moving the same from right to left, means in the carriage for supporting the member to be printed upon, manually operated means for feeding the member, escapement means for controlling the movement of the carriage, a manually operated type carrying drum slidably supported by the main frame, means for supporting an inking ribbon adjacent the drum, means for operating the escapement mechanism by sliding movement of the drum, manually operated means for operating the escapement mechanism, a hammer for pressing a portion of the member against the ribbon and type, and a pedal for operating the hammer.

2. In a printing machine of the class described, a main frame having an upright rear portion, a carriage slidably supported by the upright portion, means for moving the carriage, escapement mechanism for controlling the movement of the carriage, means including a finger bar for operating the escapement mechanism, a type carrying drum, a vertically arranged shaft on which the drum rotates, means for supporting the shaft for horizontal and vertical movement, whereby the drum can be raised and lowered and moved forwardly and rearwardly by hand as well as rotated on the shaft, means for supporting an inking ribbon adjacent the drum, means for feeding the ribbon by horizontal movement of the drum, means for operating the escapement mechanism by horizontal movement of the drum, a hammer for pressing a part of the member to be printed upon against the ribbon and type for printing the character upon the member, a pedal for operating the hammer, and means for feeding the member to be printed upon by hand.

3. In a printing machine of the class described, a main frame having an upright rear portion, a carriage slidably supported by the upright portion, a weighted cable for moving the carriage, escapement mechanism for controlling the movement of the carriage, means including a finger bar for operating the escapement mechanism, a type carrying drum, a vertically arranged shaft on which the drum rotates, means for supporting the shaft for horizontal and vertical movement, whereby the drum can be raised and lowered and moved forwardly and rearwardly by hand as well as rotated on the shaft, means for supporting an inking ribbon adjacent the drum, means for feeding the ribbon by horizontal movement of the drum, means for operating the escapement mechanism by horizontal movement of the drum, a hammer for pressing a part of the member to be printed upon against the ribbon and type for printing the character upon the member, a pedal for operating the hammer, means for feeding the member to be printed upon by hand, and means for adjusting the feeding means for different widths of members and different thicknesses of members.

4. In a printing machine of the class described, a front frame, a rear frame having its upper part extending above the top of the main frame, said frames being spaced apart for forming a space for the member to be printed upon, U-shaped members connecting the frames together and pivotally connected to the frames, a carriage supported in the upper part of the rear frame, means for moving the carriage, escapement mechanism for controlling the movement of the carriage, a space bar for operating the escapement, a type carrying drum supported for vertical and horizontal movement on the front frame, means for operating the escapement by horizontal movement of the drum, manually operated means for moving the drum vertically, an inking ribbon, means operated by the horizontal movement of the drum for feeding the ribbon step by step, a hammer member for pressing the member to be printed upon against the ribbon and the type, manually operated means for moving said hammer member, rolls carried by the carriage for engaging the member to be printed upon, means for adjusting the rolls for different thicknesses of members and different widths thereof, means for turning one set of rolls by hand, and means for holding the drum against movement when the same is in printing position.

5. In a printing machine of the class described, front and rear frames, the upper part of the rear frame extending above the plane of the top part of the front frame, a lower stand supported for horizontal movement on the front frame, an upper stand slidably connected for vertical movement to the lower stand, manually operated means for raising and lowering the upper stand, a post carried by the upper stand, a type carrying drum rotatably arranged on the post, a carriage supported at the upper part of the rear frame, means for moving the carriage in a letter spacing direction, escapement mechanism for controlling such movement, rolls supported by the carriage for holding the member to be printed upon, means for turning one set of rolls by hand, a space bar, means connecting the same with the escapement mechanism for operating the same, means for operating the escapement mechanism by sliding movement of the stands horizontally, an inking ribbon, means for operating the same step by step by horizontal sliding movement of the stands and drum, a hammer member for pressing a part of the member to be printed upon against the ribbon and type, and foot pedal operating means for said member.

6. In a typewriting machine, a low front frame, a high rear frame, said rear frame being of greater length than the length of the front frame, with the front frame located in front of the central portion of the rear frame, a carriage slidably arranged at the upper part of the rear frame, means for moving the carriage, escapement mechanism for controlling the movement of the carriage, means carried by the carriage for holding a member to be printed upon, the rear part of the front frame being spaced from the adjacent portion of the front of the rear frame to provide a narrow vertically arranged space for receiving the member to be printed upon, type carrying means located on the top of the front frame, means for adjusting the same to bring the type adjacent the member to be printed upon, and manually operated means for pressing the member against the type.

CLYDE E. HUDDLESTON.